(12) United States Patent
Andou et al.

(10) Patent No.: US 12,092,471 B2
(45) Date of Patent: Sep. 17, 2024

(54) SERVER DEVICE, INFORMATION PROCESSING SYSTEM, CONTROL DEVICE, SHARED VEHICLE, AND OPERATION METHOD FOR INFORMATION PROCESSING SYSTEM

(71) Applicant: Toyota Jidosha Kabushiki Kaisha, Toyota (JP)

(72) Inventors: Tsuyoshi Andou, Toyota (JP); Akitoshi Jikumaru, Nisshin (JP); Ryosuke Kobayashi, Nagakute (JP); Tomokazu Maya, Nagoya (JP); Masatoshi Hayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 17/308,613

(22) Filed: May 5, 2021

(65) Prior Publication Data

US 2021/0372807 A1   Dec. 2, 2021

(30) Foreign Application Priority Data

May 29, 2020  (JP) ................. 2020-094751

(51) Int. Cl.
*G01C 21/34*  (2006.01)
*G06V 20/59*  (2022.01)

(52) U.S. Cl.
CPC ..... *G01C 21/3484* (2013.01); *G01C 21/3438* (2013.01); *G01C 21/3492* (2013.01); *G06V 20/59* (2022.01)

(58) Field of Classification Search
CPC ............ G01C 21/3484; G01C 21/3438; G01C 21/3492; G06V 20/59; G06V 20/593; G06V 20/597
See application file for complete search history.

(56) References Cited

U.S. PATENT DOCUMENTS

| | | | |
|---|---|---|---|
| 2018/0089605 A1* | 3/2018 | Poornachandran | G06Q 30/0282 |
| 2018/0099630 A1* | 4/2018 | Todasco | H04W 8/183 |
| 2018/0251122 A1* | 9/2018 | Golston | B60W 50/0098 |
| 2018/0338225 A1* | 11/2018 | Shimizu | H04W 4/40 |
| 2020/0079383 A1 | 3/2020 | Shiga et al. | |
| 2020/0207281 A1* | 7/2020 | Niibe | H04R 5/02 |
| 2020/0300027 A1* | 9/2020 | Brown | B60J 5/047 |
| 2020/0333791 A1* | 10/2020 | Inoue | B60W 30/0956 |
| 2021/0194960 A1* | 6/2021 | Ventimiglia | G07C 5/008 |

FOREIGN PATENT DOCUMENTS

| | | |
|---|---|---|
| JP | 2003-155617 A | 5/2003 |
| JP | 2016094044 A | 5/2016 |
| JP | 2018-160136 A | 10/2018 |
| JP | 2019059315 A | 4/2019 |
| JP | 2020042642 A | 3/2020 |

\* cited by examiner

*Primary Examiner* — Anne Marie Antonucci
*Assistant Examiner* — Patrick M Brady
(74) *Attorney, Agent, or Firm* — Dinsmore & Shohl LLP

(57) ABSTRACT

A server device includes a communication unit and a control unit that sends and receives information to and from another device via the communication unit. The control unit sends, to a terminal device, information on a comfort level in a vehicle cabin of a shared vehicle that is determined based on a detection result of detecting an effect of a passenger on a vehicle body or equipment of the shared vehicle to present the information to another passenger before boarding the shared vehicle.

11 Claims, 5 Drawing Sheets

SERVER DEVICE, INFORMATION PROCESSING SYSTEM, CONTROL DEVICE, SHARED VEHICLE, AND OPERATION METHOD FOR INFORMATION PROCESSING SYSTEM

CROSS-REFERENCE TO RELATED APPLICATION

This application claims priority to Japanese Patent Application No. 2020-094751 filed on May 29, 2020, incorporated herein by reference in its entirety.

BACKGROUND

1. Technical Field

The present disclosure relates to a server device, an information processing system, a control device, a shared vehicle, and an operation method for the information processing system.

2. Description of Related Art

The comfort level felt by an occupant of a vehicle depends on various factors such as the temperature and humidity in the vehicle cabin and the behavior of the vehicle. Japanese Unexamined Patent Application Publication No. 2003-155617 (JP 2003-155617 A) discloses a technique for determining the comfort level based on a temperature or the like in the vehicle cabin of a taxi vehicle.

SUMMARY

Since a plurality of unspecified passengers ride on a shared vehicle such as a fixed-route bus, the factors that affect the comfort level in the vehicle cabin become complicated. Therefore, there is room for improving the convenience of passengers by accurately detecting the comfort level of the shared vehicle.

The present disclosure provides a server device and the like that can accurately detect the comfort level of a shared vehicle and improve the convenience of passengers.

A server device according to the present disclosure includes a communication unit and a control unit that sends and receives information to and from another device via the communication unit. The control unit sends, to a terminal device, information on a comfort level in a vehicle cabin of a shared vehicle that is determined based on a detection result of detecting an effect of a passenger on a vehicle body or equipment of the shared vehicle to present the information to another passenger before boarding the shared vehicle.

The control device of the shared vehicle according to the present disclosure is a control device that is mounted on a shared vehicle and that sends and receives information to and from a server device. The control device detects an effect of a passenger on a vehicle body or equipment of the shared vehicle, and sends a detection result of the effect that is detected to the server device such that the server device determines information on a comfort level in a vehicle cabin of the shared vehicle based on the detection result.

An operation method for an information processing system according to the present disclosure is an operation method for an information processing system having a server device and a control device of a shared vehicle that sends and receives information to and from the server device. The control device sends, to the server device, a detection result of detecting an effect of a passenger on a vehicle body or equipment of the shared vehicle. The server device sends, to a terminal device, information on a comfort level in a vehicle cabin of the shared vehicle that is determined based on the detection result to present the information to another passenger before boarding the shared vehicle.

According to the server device and the like in the present disclosure, it is possible to accurately detect the comfort level of the shared vehicle and improve the convenience of the passengers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described.

Figure 1:
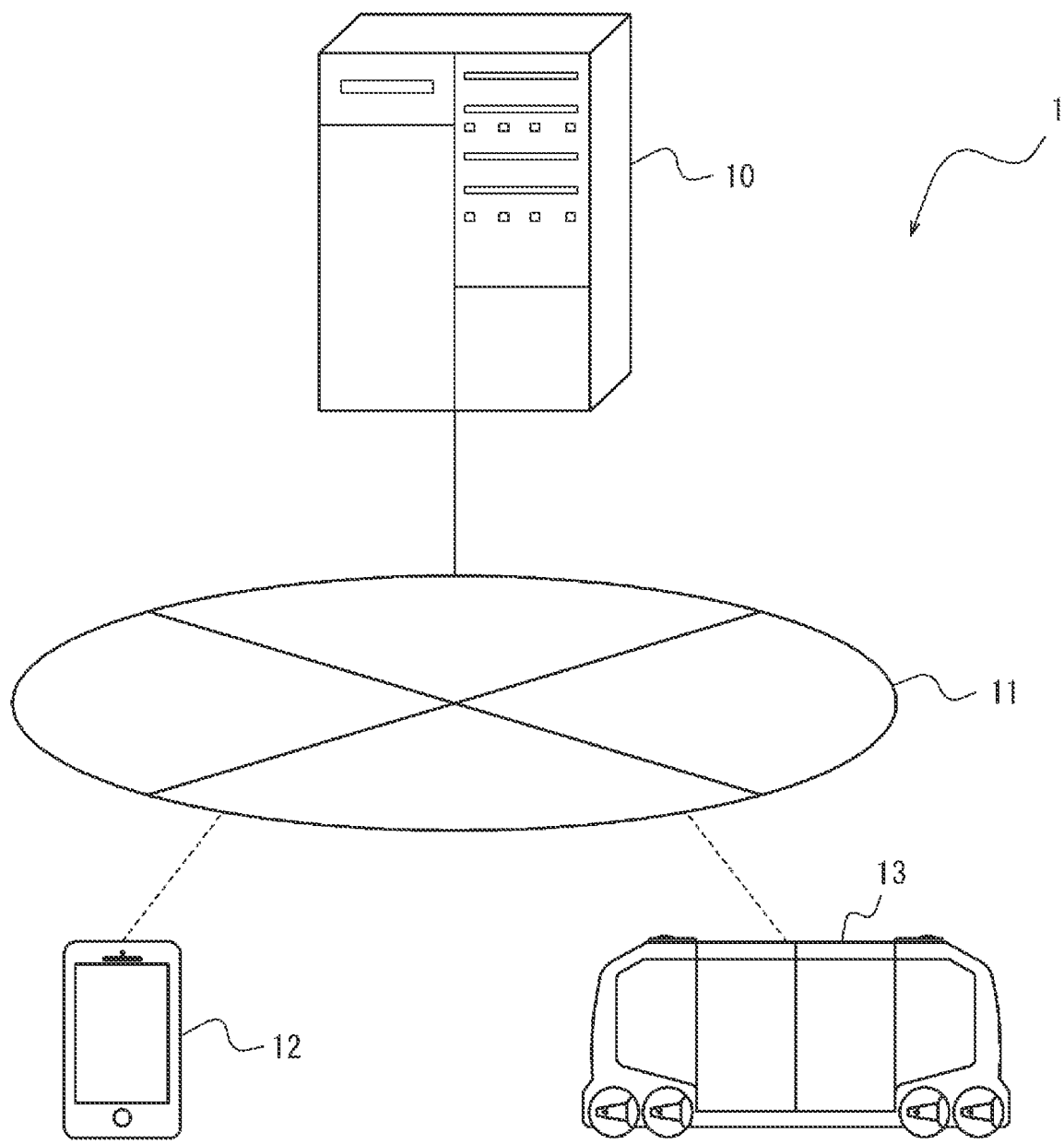
FIG. 1 is a diagram showing a configuration example of an information processing system.

FIG. 1 is a diagram showing a configuration example of an information processing system according to the embodiment. The information processing system 1 includes, for example, a server device 10, a terminal device 12, and a shared vehicle 13 that are connected to each other via a network 11 so as to be able to communicate with each other. The server device 10 is a computer. The terminal device 12 is, for example, a portable information terminal device such as a smartphone or a tablet terminal device, but may be a personal computer. The shared vehicle 13 is a bus having control/communication functions, and carries passengers by running along a designated route or running back and forth within a designated section. The network 11 is, for example, the Internet, but includes an ad hoc network, a local area network (LAN), a metropolitan area network (MAN), another network, or a combination thereof. The number of components of the information processing system 1 may be larger than that shown here.

The information processing system 1 supports the improvement of convenience for passengers who use the shared vehicle 13. For example, the server device 10 determines the comfort level in the vehicle cabin of the shared vehicle 13 based on the detection result of detecting the effect of the passengers on the vehicle body or the equipment of the shared vehicle 13. The effect of the passengers on the vehicle body is, for example, the passengers getting on and off the shared vehicle 13. In that case, the effect of the passengers is detected by a vehicle weight sensor as a change in the vehicle weight. In addition, the effect of the passengers on the equipment is, for example, the seating/non-seating of the passengers on the seats. In that case, the effect of the passengers is detected, for example, by a seating sensor as the number of seats in which the passengers are seated (hereinafter, the number of occupied seats). When the comfort level is determined based on the vehicle weight or the number of occupied seats, the server device 10 sends the comfort level information to the terminal device 12. Then, the terminal device 12 sends the comfort level information to the terminal device 12 of the passenger in order to present the information to the passenger before boarding the shared vehicle 13. The passenger before boarding the shared vehicle 13 is, for example, a passenger waiting for the arrival of the shared vehicle 13 at the bus stop. The passenger checks the comfort level information output by the terminal device 12 that the passenger carries on his/her own or that is installed at the bus stop. Since the passenger before boarding the shared vehicle 13 can grasp the comfort level of the shared vehicle 13 in advance before boarding, the passenger can select whether to board the shared vehicle 13 based on the comfort level and his/her preference. Therefore, according to the information processing system 1, it is possible to improve the convenience of the passengers by accurately detecting the comfort level in the shared vehicle 13, although the factors that affect the comfort level of the shared vehicle 13 are complicated.

Figure 2:
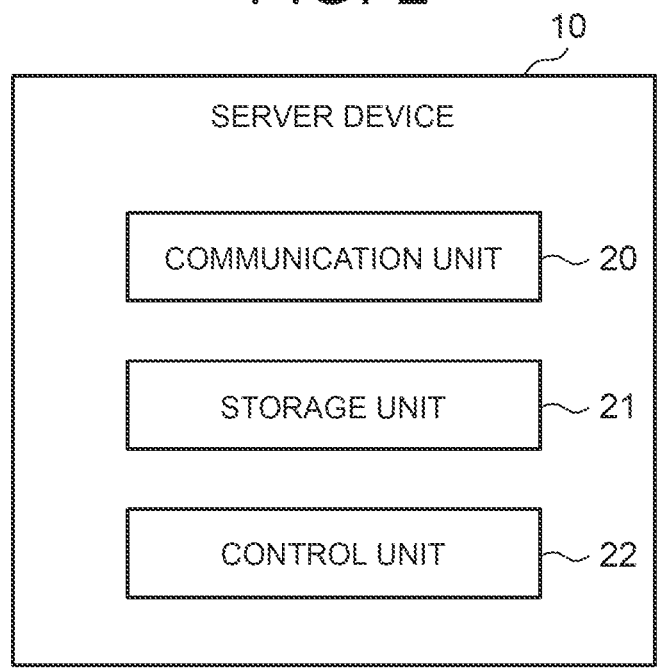
FIG. 2 is a diagram showing a configuration example of a server device.

FIG. 2 shows a configuration example of the server device 10. The server device 10 has a communication unit 20, a storage unit 21, and a control unit 22. The server device 10 may perform the operation according to the present embodiment by communicating with and cooperating with another server device having an equivalent configuration.

The communication unit 20 has one or more communication modules corresponding to a wired or wireless LAN standard for connecting to the network 11. In the present embodiment, the server device 10 is connected to the network 11 via the communication unit 20, and performs information communication with another device via the network 11.

The storage unit 21 has, for example, a semiconductor memory, a magnetic memory, an optical memory, or the like. The storage unit 21 functions as, for example, a main storage device, an auxiliary storage device, or a cache memory. The storage unit 21 stores information, a control/processing program, and the like used for the operation of the server device 10.

The control unit 22 has, for example, one or more general-purpose processors such as a central processing unit (CPU), or one or more dedicated processors specialized for a specific process. Alternatively, the control unit 22 may have one or more dedicated circuits such as a field-programmable gate array (FPGA) and an application specific integrated circuit (ASIC). The control unit 22 comprehensively controls the operation of the server device 10 by operating according to the control/processing program or operating according to an operation procedure implemented as a circuit. Then, the control unit 22 sends and receives various kinds of information to and from the terminal device 12 and the shared vehicle 13 via the communication unit 20, and performs the operation according to the present embodiment.

Figure 3:
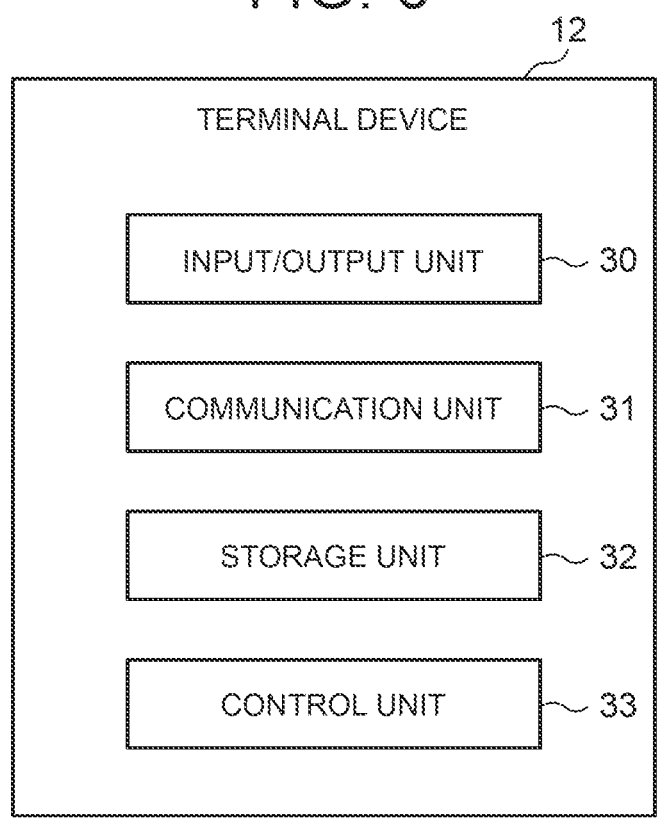
FIG. 3 is a diagram showing a configuration example of a terminal device.

FIG. 3 shows a configuration example of the terminal device 12. The terminal device 12 is an information terminal device such as a smartphone, a tablet terminal device, or a personal computer. Further, the terminal device 12 may be a dedicated terminal device installed at a bus stop or the like and providing various kinds of information to the passengers before boarding the shared vehicle 13. The terminal device 12 has an input/output unit 30, a communication unit 31, a storage unit 32, and a control unit 33.

The input/output unit 30 has an input interface that detects the user's input and sends the input information to the control unit 33. The input interface is any input interface including, for example, a physical key, a capacitive key, a touch screen integrated with a panel display, various pointing devices, a microphone that accepts voice input, a camera that captures a captured image or an image code, and the like. Further, the input/output unit 30 has an output interface that outputs, to the user, information generated by the control unit 33 or received from another device. The output interface is any output interface including, for example, an external or built-in display that outputs information as an image/video, a speaker that outputs information as audio, or a connection interface for an external output device.

The communication unit 31 has a communication module corresponding to a wired or wireless LAN standard, a module corresponding to a mobile communication standard such as fourth generation (4G) and fifth generation (5G), a Global Positioning System (GPS) receiver module, and the like. The terminal device 12 is connected to the network 11 through the communication unit 31 via a nearby router device or a mobile communication base station, and performs information communication with other devices via the network 11. Further, the terminal device 12 receives a GPS signal indicating the current position by the communication unit 31.

The storage unit 32 has, for example, a semiconductor memory, a magnetic memory, an optical memory, or the like. The storage unit 32 functions as, for example, a main storage device, an auxiliary storage device, or a cache memory. The storage unit 32 stores information, a control/processing program, and the like used for the operation of the terminal device 12.

The control unit 33 has, for example, one or more general-purpose processors such as a CPU, a micro processing unit (MPU), or one or more dedicated processors specialized for a specific process. Alternatively, the control unit 33 may have one or more dedicated circuits such as an FPGA and an ASIC. The control unit 33 comprehensively controls the operation of the terminal device 12 by operating according to the control/processing program or operating according to an operation procedure implemented as a circuit. Then, the control unit 33 sends and receives various kinds of information to and from the server device 10 and the like via the communication unit 31, and performs the operation according to the present embodiment.

Figure 4:
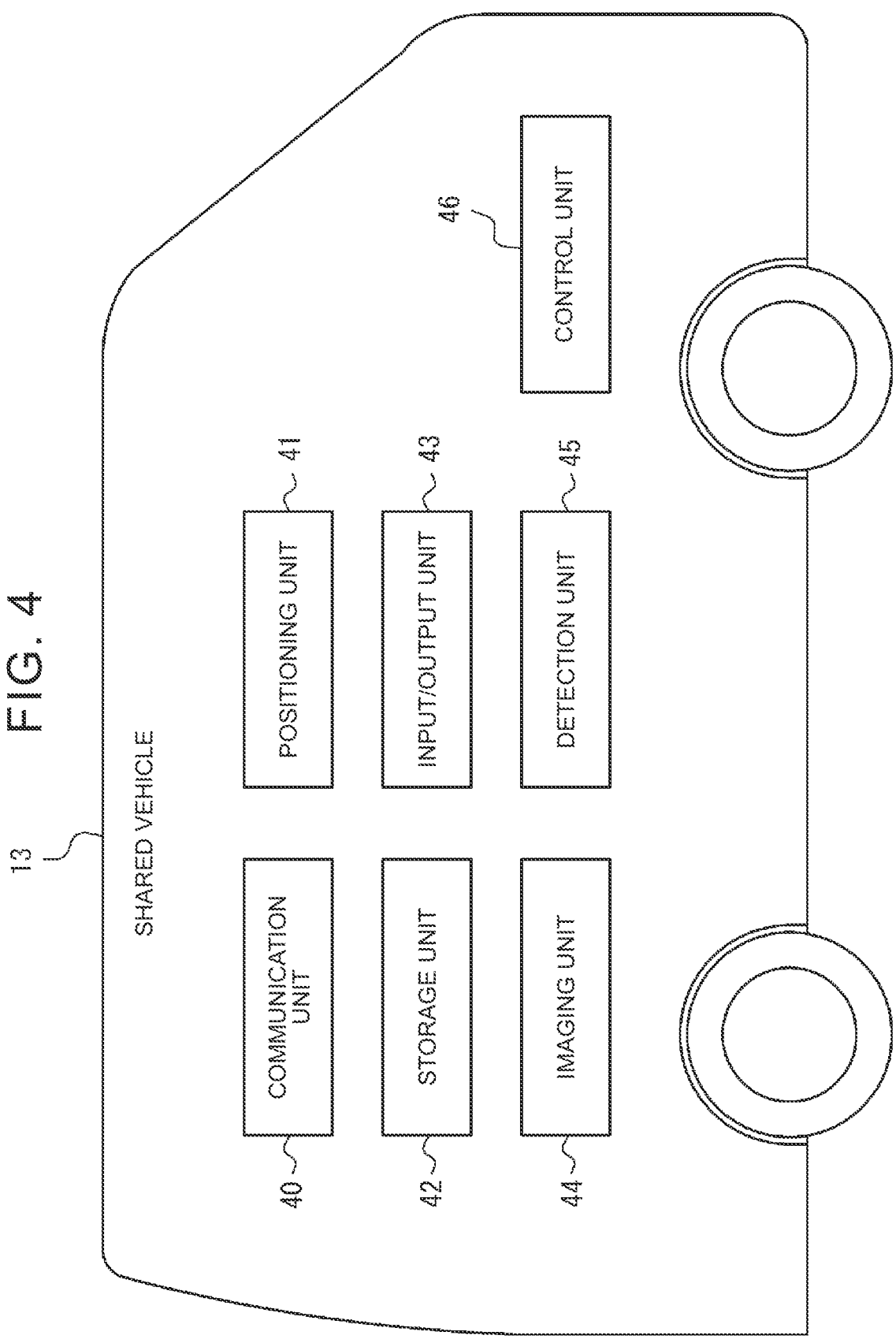
FIG. 4 is a diagram showing a configuration example of a shared vehicle.

FIG. 4 shows a configuration example of the shared vehicle 13. The shared vehicle 13 is a shared bus capable of manual driving or manned/unmanned autonomous driving. The shared vehicle 13 includes a communication unit 40, a positioning unit 41, a storage unit 42, an input/output unit 43, an imaging unit 44, a detection unit 45, and a control unit 46. Each unit is connected to each other through wired or wireless communication so as to be able to communicate with each other via an in-vehicle network such as a Controller Area Network (CAN) or a dedicated line. One or all of the communication unit 40, the positioning unit 41, the storage unit 42, the input/output unit 43, the imaging unit 44, the detection unit 45, and the control unit 46 may be provided directly on the shared vehicle 13, or may be provided in a control device that can be attached to and detached from the shared vehicle 13, such as a car navigation device. The shared vehicle 13 may be driven by a driver, or the driving may be automated at a desired level. The level of automation is, for example, one of level 1 to level 5 classified by the Society of Automotive Engineers (SAE).

The communication unit 40 has a communication module corresponding to a wired or wireless LAN standard, a module corresponding to a mobile communication standard such as 4G and 5G, and the like. The shared vehicle 13 is connected to the network 11 through the communication unit 40 via a mobile communication base station, and performs information communication with other devices via the network 11.

The positioning unit 41 measures the position of the shared vehicle 13 and generates position information. The position information is information that specifies a position on a map, for example, including coordinates such as two-dimensional coordinates and three-dimensional coordinates. Further, the position information is not limited to the coordinates and may include the speed, the running route, the moving distance, the amount of changes thereof, the rate of the changes, and the like. The positioning unit 41 includes a receiver corresponding to the satellite positioning system. The satellite positioning system that the receiver corresponds to may be, for example, the GPS. Alternatively, the positioning unit 41 may have an acceleration sensor, a gyro sensor, or the like. Further, for example, a car navigation device may function as the positioning unit 41.

The storage unit 42 has, for example, a semiconductor memory, a magnetic memory, an optical memory, or the like. The storage unit 42 functions as, for example, a main storage device, an auxiliary storage device, or a cache memory. The storage unit 42 stores information, a control/processing program, and the like used for control of the operation of the shared vehicle 13.

The input/output unit 43 has an input interface that detects the user's input and sends the input information to the control unit 46. The input interface is any input interface including, for example, a physical key, a capacitive key, a touch screen integrated with a panel display, various pointing devices, a microphone that accepts voice input, a camera that captures a captured image or an image code, an integrated circuit (IC) card reader, and the like. Further, the input/output unit 43 has an output interface that outputs, to the user, information generated by the control unit 46 or received from the server device 10. The output interface is any output interface including, for example, a display that outputs information as an image/video, a speaker that outputs information as audio, or a connection interface for an external output device.

The imaging unit 44 includes one or more cameras and a control circuit therefor, which are provided at positions that enable imaging in the vehicle cabin of the shared vehicle 13. The camera of the imaging unit 44 may be a monocular camera or a stereo camera. The imaging unit 44 images, for example, the inside of the vehicle cabin at predetermined time intervals, and sends the captured images to the control unit 46. Hereinafter, the captured image includes a plurality of captured images captured at predetermined time intervals. When the imaging unit 44 has a plurality of cameras that capture different ranges in the vehicle cabin, the imaging unit 44 sends the images captured by each camera to the control unit 46.

The detection unit 45 has sensors for detecting the state of the shared vehicle 13 and sensors for detecting the state of the equipment of the shared vehicle 13. Further, the detection unit 45 has sensors for detecting the state of the atmosphere in the vehicle cabin of the shared vehicle 13. The sensors included in the detection unit 45 include, for example, a vehicle weight sensor provided on the suspension of the shared vehicle 13 to detect the vehicle weight, seating sensors provided on each seat of the shared vehicle 13 to detect whether a passenger is seated or not seated based on the load on the seat surface, sensors that detect various atmospheric conditions such as temperature, humidity, smell, and carbon dioxide concentration in the vehicle cabin of the shared vehicle 13, and sensors that detect various types of behavior of the shared vehicle 13 such as vehicle speed, acceleration, steering, inclination, etc. The sensors of the detection unit 45 send the detected information to the control unit 46.

The control unit 46 has one or more general-purpose processors such as a CPU and an MPU, or one or more dedicated processors specialized for a specific process. Alternatively, the control unit 46 may have one or more dedicated circuits such as an FPGA and an ASIC. The control unit 46 comprehensively controls the operations of the shared vehicle 13 including the communication unit 40, the positioning unit 41, the storage unit 42, the input/output unit 43, the imaging unit 44, and the detection unit 45 by operating according to a control/processing program or operating according to an operation procedure implemented as a circuit. When autonomous driving of the shared vehicle 13 is performed, the control unit 46 sends information necessary for the operation of the shared vehicle 13 to the control device that controls the autonomous driving. The control unit 46 sends and receives various kinds of information to and from the server device 10 via the communication unit 40, and performs the operation according to the present embodiment.

Figure 5:
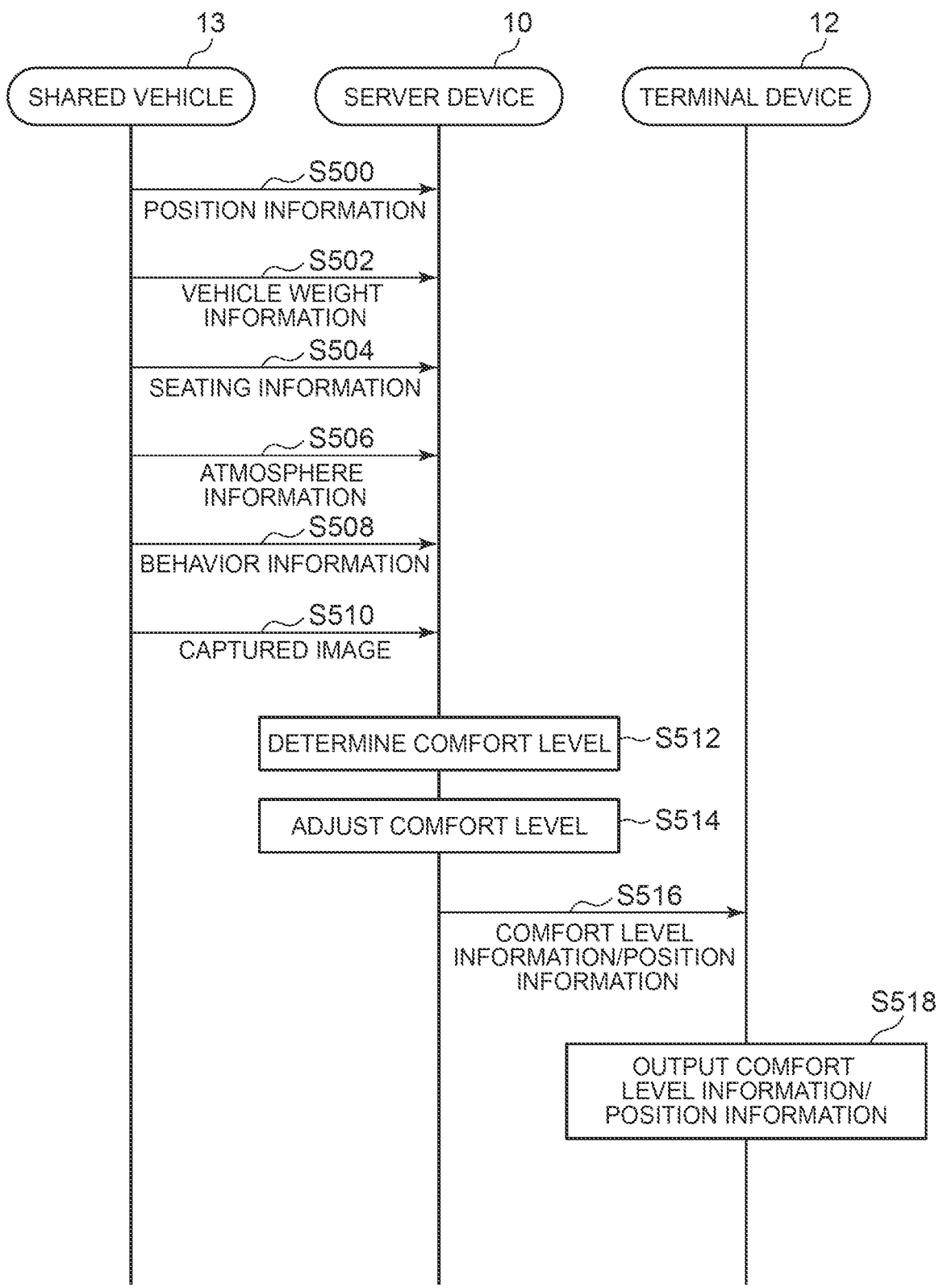
FIG. 5 is a sequence diagram showing an operation example of the information processing system.

FIG. 5 is a sequence diagram showing an operation example of the information processing system 1. FIG. 5 shows an operation procedure of the cooperative operation by the server device 10, the terminal device 12, and the shared vehicle 13. The procedure of FIG. 5 is executed while the shared vehicle 13 is in operation.

In step S500, the shared vehicle 13 sends the position information to the server device 10. The control unit 46 of the shared vehicle 13 sends the current position of the shared vehicle 13 acquired from the positioning unit 41 to the server device 10 via the communication unit 40. The control unit 22 of the server device 10 receives the position information via the communication unit 20.

In step S502, the shared vehicle 13 sends the vehicle weight information to the server device 10. The control unit 46 of the shared vehicle 13 sends information indicating the vehicle weight of the shared vehicle 13 detected by the detection unit 45 to the server device 10 via the communication unit 40. The control unit 22 of the server device 10 receives the vehicle weight information via the communication unit 20.

In step S504, the shared vehicle 13 sends the seating information to the server device 10. The control unit 46 of the shared vehicle 13 sends the seating information indicating the number of occupied seats of the shared vehicle 13 detected by the detection unit 45 to the server device 10 via the communication unit 40. The control unit 22 of the server device 10 receives the seating information via the communication unit 20.

In step S506, the shared vehicle 13 sends the atmosphere information to the server device 10. The control unit 46 of the shared vehicle 13 sends the atmosphere information indicating the atmospheric condition in the vehicle cabin of the shared vehicle 13 such as the temperature, the humidity, the smell, and the carbon dioxide concentration detected by the detection unit 45 to the server device 10 via the communication unit 40. The control unit 22 of the server device 10 receives the atmosphere information via the communication unit 20.

In step S508, the shared vehicle 13 sends the behavior information to the server device 10. The control unit 46 of the shared vehicle 13 sends the behavior information indicating the behavior of the shared vehicle 13 such as acceleration, steering, and inclination detected by the detection unit 45 to the server device 10 via the communication unit 40. The control unit 22 of the server device 10 receives the behavior information via the communication unit 20.

In step S510, the shared vehicle 13 sends the captured image to the server device 10. The control unit 46 of the shared vehicle 13 sends the captured image of the inside of the vehicle cabin of the shared vehicle 13, which is captured by the imaging unit 44, to the server device 10 via the communication unit 40. The control unit 22 of the server device 10 receives the captured image via the communication unit 20.

Here, a case is described where the vehicle weight information, the seating information, the behavior information, the atmosphere information, and the captured image are sent from the shared vehicle 13 to the server device 10. Note that either one or both of the vehicle weight information and the seating information may be sent and received. Further, sending and receiving of the behavior information, the atmosphere information, and the captured image may be omitted, or one or more of them may be sent and received.

In step S512, the server device 10 determines the comfort level of the shared vehicle 13. The control unit 22 of the server device 10 determines the comfort level based on, for example, the vehicle weight information or the seating information of the shared vehicle 13.

The control unit 22 compares, for example, the vehicle weight of the shared vehicle 13 indicated by the vehicle weight information with a predetermined reference that is stored. For example, the storage unit 21 stores the vehicle weight in association with scores based on a plurality of stages as the comfort level. The heavier the vehicle weight, the more passengers on board, that is, the higher the possibility of the degree of congestion, and the lighter the vehicle weight, the fewer passengers on board, that is, the lower the possibility of the degree of congestion. The higher the degree of congestion, the lower the comfort level, and the lower the degree of congestion, the higher the comfort level. Therefore, the vehicle weight is associated with a lower comfort level as the vehicle weight increases, and a higher comfort level as the vehicle weight decreases. The control unit 22 determines the comfort level by reading the comfort level corresponding to the vehicle weight from the storage unit 21.

Further, the control unit 22 compares, for example, the number of occupied seats indicated by the seating information with the number of seats of the shared vehicle 13, and calculates the number of vacant seats. The number of seats of the shared vehicle 13 may be stored in the storage unit 21 in advance, or may be sent from the shared vehicle 13 together with the seating information. In the storage unit 21, scores based on a plurality of stages is stored in association with the number of vacant seats as the comfort level. The smaller the number of vacant seats, the more passengers on board, that is, the higher the possibility of the degree of congestion, and the larger the number of vacant seats, the fewer passengers on board, that is, the lower the possibility of the degree of congestion. The higher the degree of congestion, the lower the comfort level, and the lower the degree of congestion, the higher the comfort level. Therefore, the number of vacant seats is associated with a lower comfort level as the number of vacant seats decreases, and a higher comfort level as the number of vacant seats increases. The control unit 22 determines the comfort level by reading the comfort level corresponding to the number of vacant seats from the storage unit 21.

Alternatively, the control unit 22 may determine the comfort level based on, for example, the vehicle weight and the number of occupied seats. Even when the number of vacant seats is small, if the number of passengers standing in the aisle is small, the degree of congestion is low and thus the comfort level is relatively high. In contrast, even when the number of vacant seats is large, if the number of passengers standing in the aisle is large, the degree of congestion may locally increase and thus the comfort level may be relatively low. Therefore, when the number of passengers on board calculated from the vehicle weight is equal to or smaller than the number of occupied seats, it is unlikely that there are passengers standing in the aisle, so that the control unit 22 adopts the comfort level based on the number of occupied seats. The control unit 22 calculates the number of passengers on board by dividing the vehicle weight by a predetermined reference weight. Further, when the number of passengers on board calculated from the vehicle weight exceeds the number of occupied seats, it is highly probable that there are passengers standing in the aisle, so that the control unit 22 reduces the comfort level based on the number of occupied seats in accordance with the number of passengers on board that exceeds the number of occupied seats. For example, the storage unit 21 stores an adjustment amount based on the difference between the number of occupied seats and the number of passengers on board. The difference between the number of occupied seats and the number of passengers on board is associated with an adjustment amount such that the smaller the difference, the higher the comfort level, and the larger the difference, the lower the comfort level. The adjustment amount is, for example, a coefficient to be multiplied by a score indicating the comfort level, or an amount to be added or subtracted to or from the score (the same applies hereinafter). The control unit 22 determines the comfort level by reading the adjustment amount corresponding to the difference and reducing the comfort level by the adjustment amount.

In step S514, the server device 10 adjusts the comfort level of the shared vehicle 13. The control unit 22 of the server device 10 adjusts, for example, the comfort level determined based on either or both of the vehicle weight information and the seating information of the shared vehicle 13 in accordance with one or more of the atmosphere information, the behavior information, and the captured image sent from the shared vehicle 13 to the server device 10. When sending and receiving of the atmosphere information, the behavior information, and the captured image are omitted, step S514 is omitted.

The control unit 22 adjusts, for example, the comfort level determined based on either or both of the vehicle weight information and the number of occupied seats in accordance with the temperature, the humidity, the smell, or the carbon dioxide concentration in the vehicle cabin of the shared vehicle 13 indicated by the atmosphere information. For example, the storage unit 21 stores an adjustment amount based on the temperature, the humidity, or the smell. It is highly probable that the greater the deviation of the temperature or the humidity in the vehicle cabin of the shared vehicle 13 from each predetermined reference value, the lower the comfort level, and the smaller the deviation thereof, the higher the comfort level. Therefore, the amount of deviation of the temperature or the humidity from each reference value is associated with an adjustment amount such that the larger the deviation, the lower the comfort level, and the smaller the deviation, the higher the comfort level. The control unit 22 reads the adjustment amount corresponding to the temperature or the humidity, and adjusts the comfort level by the adjustment amount. Further, for example, the storage unit 21 stores an adjustment amount based on the type of smell. Based on experiments and the like, the type of smell is associated with an adjustment amount such that the comfort level increases for the type of smell that makes the passengers feel comfortable, and the comfort level decreases for the type of smell that makes the passengers feel uncomfortable. In addition, the magnitude of each adjustment amount is predetermined based on experiments and the like. The control unit 22 reads the adjustment amount corresponding to the type of smell, and adjusts the comfort level by the adjustment amount. Further, for example, the storage unit 21 stores an adjustment amount based on the carbon dioxide concentration. Based on experiments and the like, the carbon dioxide concentration is associated with an adjustment amount such that the comfort level increases as the carbon dioxide concentration is lower and the comfort level decreases as the carbon dioxide concentration is higher. The control unit 22 reads the adjustment amount corresponding to the carbon dioxide concentration, and adjusts the comfort level by the adjustment amount.

Further, the control unit 22 adjusts, for example, the comfort level determined based on either or both of the vehicle weight and the number of occupied seats in accordance with the behavior of the shared vehicle 13 indicated by the behavior information. For example, the storage unit 21 stores an adjustment amount based on the behavior. For example, it is highly probable that the greater the acceleration indicating a sudden start/stop of the shared vehicle 13, the larger the discomfort of the passengers on board, that is, the lower the comfort level, and the smaller the acceleration, the smaller the discomfort of the passengers on board, that is, the higher the comfort level. Therefore, the acceleration is associated with an adjustment amount such that the larger the acceleration, the lower the comfort level, and the smaller the acceleration, the higher the comfort level. Further, it is highly probable that the greater the lateral acceleration, the rate of change in the steering angle, or the rate of change in the inclination of the vehicle body, which indicates steep steering of the shared vehicle 13, the larger the discomfort of the passengers on board, that is, the lower the comfort level, and the smaller the lateral acceleration, the rate of change in the steering angle, or the rate of change in the inclination of the vehicle body, the smaller the discomfort of the passengers on board, that is, the higher the comfort level. Therefore, the lateral acceleration, the rate of change in the steering angle, or the rate of change in the inclination of the vehicle body is associated with an adjustment amount such that the larger the value, the lower the comfort level, and the smaller the value, the higher the comfort level. The control unit 22 reads the adjustment amount corresponding to the behavior, and adjusts the comfort level by the adjustment amount.

Further, the control unit 22 adjusts, for example, the comfort level determined based on either or both of the vehicle weight and the number of occupied seats in accordance with the captured image of the inside of the vehicle cabin of the shared vehicle 13. For example, the control unit 22 detects a passenger's facial expression or behavior by performing image processing on the captured image. The storage unit 21 stores an adjustment amount based on the type of the passenger's facial expression and behavior. Based on experiments and the like, the type of the passenger's facial expression and behavior is associated with an adjustment amount such that the comfort level increases for facial expressions and behavior that express comfort of the passenger, and the comfort level decreases for facial expressions and behavior that express discomfort of the passenger. In addition, the magnitude of each adjustment amount is predetermined based on experiments and the like. The control unit 22 reads the adjustment amount corresponding to the passenger's facial expression and behavior, and adjusts the comfort level by the adjustment amount.

Here, when the comfort level is adjusted based on two or more of the atmosphere information, the behavior information, and the captured image, each adjustment amount may be applied independently to the comfort level, or a representative value of two or more adjustment amounts may be applied to the comfort level. The representative value of the two or more adjustment amounts is, for example, an average value, a median value, and the like.

In step S516, the server device 10 sends the comfort level and the position information of the shared vehicle 13 to the terminal device 12. The control unit 22 of the server device 10 sends the comfort level and the position information to the terminal device 12 via the communication unit 20. The control unit 33 of the terminal device 12 receives the comfort level and the position information via the communication unit 31.

In step S518, the terminal device 12 outputs the comfort level and the position information of the shared vehicle 13. The control unit 33 of the terminal device 12 outputs the comfort level and the position information as an image or audio by the input/output unit 30, and presents the comfort level and the position information to the passenger before boarding the shared vehicle 13 at the bus stop using the terminal device 12.

When a plurality of the shared vehicles 13 are operated, the procedure of FIG. 5 is executed for each of the shared vehicles 13. Thus, in that case, the terminal device 12 outputs the comfort level and the position information for each of the shared vehicles 13. Therefore, the passenger before boarding the shared vehicle 13 can compare the positions and comfort levels of the shared vehicles 13 and select which shared vehicle 13 to board based on the comfort levels and his/her preference.

Figure 6:
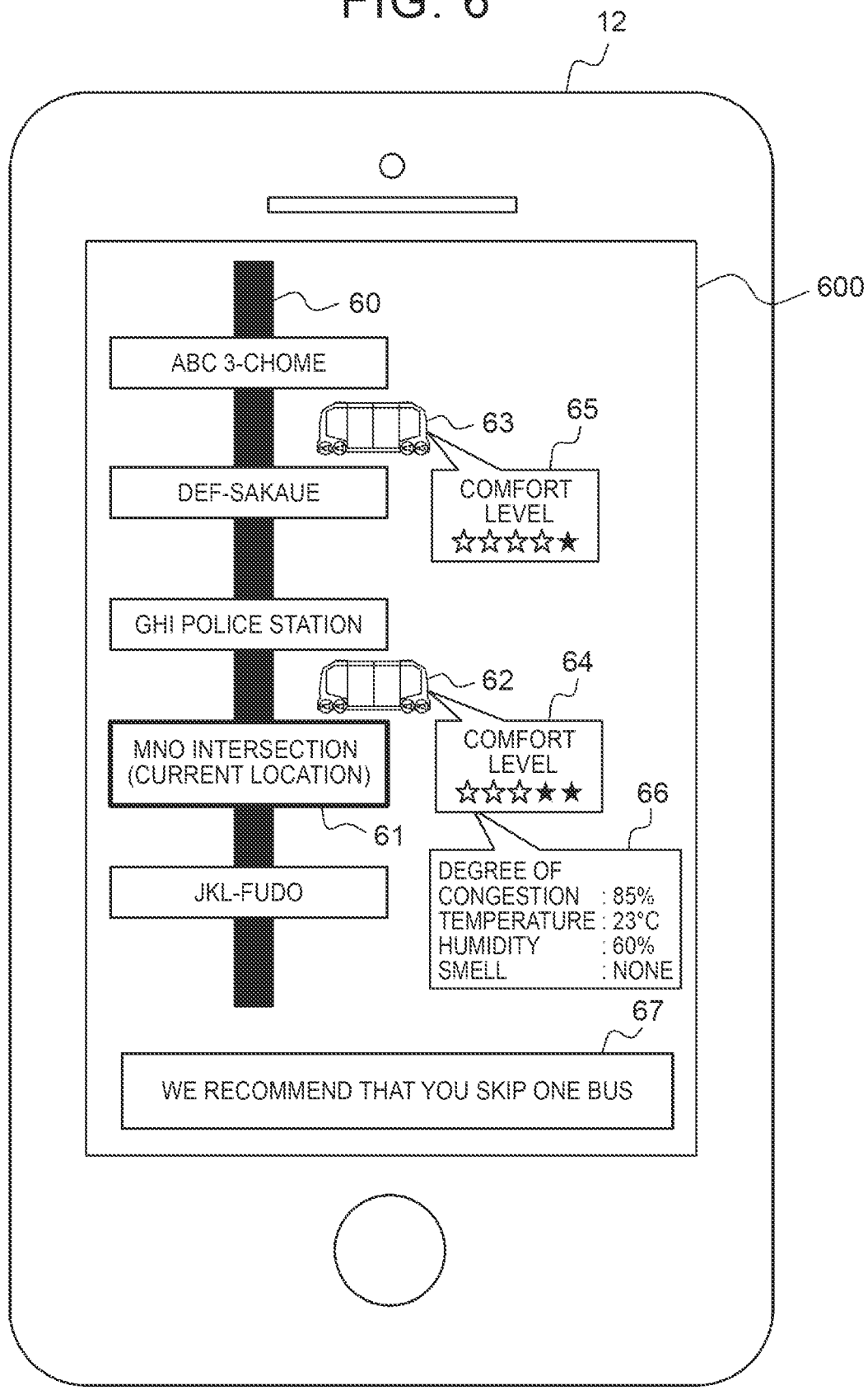
FIG. 6 is a diagram showing an example of a display screen of the terminal device.

FIG. 6 shows an example of a display/input screen of the terminal device 12. On a display screen 600 of the terminal device 12, the position 61 of the terminal device 12 and the positions 62 and 63 of the shared vehicles 13 are displayed on a schematic bus route 60. Here, a state is shown where a passenger using the terminal device 12 before boarding the shared vehicle 13 is present at a bus stop "MNO Intersection", and a shared vehicle 13 is heading toward the bus stop "MNO Intersection" from the previous bus stop "GHI Police Station". The control unit 33 of the terminal device 12 derives and displays the position of the terminal device 12 from the GPS signal acquired by the communication unit 31. In addition, a state is shown where the subsequent shared vehicle 13 is heading from the bus stop "ABC 3-Chome" that is three stops before toward the bus stop "DEF-Sakaue" that is two stops before. Further, the comfort levels 64 and 65 of each of the shared vehicles 13 are shown. For example, the comfort level 64 of the shared vehicle 13 arriving next indicates three points out of five levels, and the comfort level 65 of the subsequent shared vehicle 13 indicates four points out of five levels.

By referring to such a display screen 600, the passenger before boarding may select, for example, to board the arriving shared vehicle 13 even though the comfort level is low if his/her time is limited, and may select to wait for the subsequent shared vehicle 13 that is more comfortable instead of boarding the arriving shared vehicle 13 if his/her time is not limited. Therefore, it is possible to improve the convenience of passengers.

Further, the terminal device 12 may display a detailed comfort level in response to, for example, a passenger's operation input before boarding. For example, when a passenger taps the comfort level 64 on the display screen 600, the detailed comfort level 66 is displayed with a balloon or the like. Here, an example is shown in which the degree of congestion, the temperature, the humidity, the smell, etc. are displayed. For example, the control unit 22 of the server device 10 obtains the degree of congestion from the number of passengers on board obtained by either or both of the vehicle weight and the number of occupied seats, and the designed maximum number of passengers of the shared vehicle 13, and sends the degree of congestion to the terminal device 12. Further, the detailed comfort level 66 may include other information such as the behavior information of the shared vehicle 13 or a part of the captured image of the inside of the vehicle cabin of the shared vehicle 13. By doing so, the passenger before boarding can decide to board the shared vehicle 13 based on more specific information.

Further, when a plurality of the shared vehicles 13 is operated, the terminal device 12 may present to a passenger before boarding information prompting the passenger to board the shared vehicle 13 having a higher comfort level. For example, the terminal device 12 displays a notification 67 on the display screen 600. Here, since the comfort level of the subsequent shared vehicle 13 is higher than the comfort level of the arriving shared vehicle 13, the notification 67 includes characters prompting the passenger to board the subsequent shared vehicle 13 such as "We recommend that you skip one bus". In contrast, if the comfort level of the arriving shared vehicle 13 is higher than the comfort level of the subsequent shared vehicle 13, the notification 67 may include characters prompting the passenger to board the arriving shared vehicle 13 such as "We recommend that you board the arriving bus". The information for displaying the notification 67 may be generated by the server device 10 based on the comparison of the comfort levels of the shared vehicles 13 and sent to the terminal device 12 together with the information on the comfort levels of the shared vehicles 13, or may be generated by the terminal device 12 based on the comparison of the comfort levels of the shared vehicles 13 received from the server device 10.

FIG. 6 shows an example of displaying the position 61 of the terminal device 12, the positions 62 and 63 of the shared vehicles 13, etc. on the bus route 60. However, for example, the terminal device 12 may display the position 61 of the terminal device 12, the positions 62 and 63 of the shared vehicles 13, etc. on a map instead of on the bus route 60. Further, the number of the shared vehicles 13 may be three or more.

In the above description, the procedure may be such that steps S502 to S510 of FIG. 5 are omitted, a part or all of steps S512 and S514 are executed by the control unit 46 of the shared vehicle 13, and the shared vehicle 13 sends the comfort level to the server device 10.

According to the embodiment described above, it is possible to accurately detect the comfort level of the shared vehicle and improve the convenience of passengers.

In the embodiment described above, the processing/control program defining the operation of the control unit 33 of the terminal device 12 may be stored in the storage unit 21 of the server device 10 or in a storage unit of another server device, and may be downloaded to each terminal device via the network 11. Alternatively, the processing/control program may be stored in a portable, non-transitory recording/storage medium that can be read by each terminal device, and may be read from the medium by each terminal device. Further, the processing/control program defining the operation of the control unit 46 of the shared vehicle 13 may be stored in the storage unit 21 of the server device 10 or in a storage unit of another server device, and may be downloaded to the storage unit of the shared vehicle 13 via the network 11. Alternatively, the processing/control program may be stored in a portable, non-transitory recording/storage medium that can be read by the control unit 46, and may be read from the medium by the control unit 46.

Although the embodiment has been described above based on the drawings and examples, it should be noted that those skilled in the art can easily make various modifications and alterations thereto based on the present disclosure. It should be noted, therefore, that these modifications and alterations are within the scope of the present disclosure. For example, the functions included in each step, etc. can be rearranged so as not to be logically inconsistent, and a plurality of steps, etc. can be combined into one or divided.

What is claimed is:

1. A server device comprising:
   a communication unit; and
   a control unit that sends and receives information to and from another device via the communication unit, wherein the control unit sends, to a terminal device, information on a comfort level in a vehicle cabin of a shared vehicle that is determined based on a detection result of detecting an effect of a passenger on a vehicle body or equipment of the shared vehicle to present the information to another passenger before boarding the shared vehicle, wherein:
   the control unit further sends, to the terminal device, information on the comfort level in a vehicle cabin of another shared vehicle,
   the control unit further sends, to the terminal device, information for prompting the other passenger to select one of a shared vehicle selected from the shared vehicle and the other shared vehicle based on a comparison of the comfort level of the shared vehicle and the comfort level of the other shared vehicle, the comfort level is further determined based on a vehicle weight of the shared vehicle and a seating state of seats,
   the comfort level is adjusted in consideration of a state of atmosphere in the vehicle cabin; and
   the information on the comfort level sent by the control unit to the terminal device to present the information to the other passenger is to aid in the selection between the shared vehicle and the other shared vehicle based on the comparison of the comfort level of the shared vehicle and the comfort level of the other shared vehicle;
   the detection result includes the vehicle weight of the shared vehicle and the seating state of seats;
   the seating state of seats includes a number of occupied seats;
   when a number of the passengers calculated from the vehicle weight is equal to or smaller than the number of occupied seats, the control unit adopts the comfort level based on the number of occupied seats;
   when the number of the passengers calculated from the vehicle weight exceeds the number of occupied seats, the control unit reduces the comfort level based on the number of occupied seats in accordance with the number of the passengers that exceeds the number of occupied seat;

the shared vehicle further comprises a detection unit including:

a vehicle weight sensor provided on a suspension of the shared vehicle and configured to detect the vehicle weight of the shared vehicle;

a plurality of seating sensors provided on each seat of the shared vehicle to detect whether a passenger is seated or not seated based on a load on a seat surface of the shared vehicle;

at least one sensor configured to detect a temperature, a humidity, a smell, and a carbon dioxide concentration in the vehicle cabin of the shared vehicle; and a plurality of sensors configured to detect a vehicle speed, an acceleration, a steering, and an inclination of the shared vehicle; and the detection result is based on the detections of the detection unit.

2. The server device according to claim 1, wherein the comfort level is adjusted in consideration of a behavior of the shared vehicle.

3. The server device according to claim 1, wherein the comfort level is adjusted in consideration of a captured image of an inside of the vehicle cabin.

4. An information processing system comprising:
the server device according to claim 1; and
a control device of the shared vehicle.

5. A control device that is mounted on a shared vehicle and that sends and receives information to and from a server device, wherein the control device detects an effect of a passenger on a vehicle body or equipment of the shared vehicle, and sends a detection result of the effect that is detected to the server device such that the server device determines information on a comfort level in a vehicle cabin of the shared vehicle based on the detection result,
wherein:

the control device sends, to the terminal device, information on the comfort level in a vehicle cabin of another shared vehicle, the control device further sends, to the server device, information for prompting the other passenger to select one of a shared vehicle selected from the shared vehicle and the other shared vehicle based on a comparison of the comfort level of the shared vehicle and the comfort level of the other shared vehicle, the comfort level is further determined based on a vehicle weight of the shared vehicle and a seating state of seats, the control device sends, to the server device, information indicating a behavior of the shared vehicle to adjust the comfort level, and the information on the comfort level sent by the control device to the terminal device to present the information to the other passenger is to aid in the selection between the shared vehicle and the other shared vehicle based on the comparison of the comfort level of the shared vehicle and the comfort level of the other shared vehicle;

the detection result includes the vehicle weight of the shared vehicle and the seating state of seats;

the seating state of seats includes a number of occupied seats;

when a number of the passengers calculated from the vehicle weight is equal to or smaller than the number of occupied seats, the control unit adopts the comfort level based on the number of occupied seats;

when the number of the passengers calculated from the vehicle weight exceeds the number of occupied seats, the control unit reduces the comfort level based on the number of occupied seats in accordance with the number of the passengers that exceeds the number of occupied seat;

the shared vehicle further comprises a detection unit including:

a vehicle weight sensor provided on a suspension of the shared vehicle and configured to detect the vehicle weight of the shared vehicle;

a plurality of seating sensors provided on each seat of the shared vehicle to detect whether a passenger is seated or not seated based on a load on a seat surface of the shared vehicle;

at least one sensor configured to detect a temperature, a humidity, a smell, and a carbon dioxide concentration in the vehicle cabin of the shared vehicle; and a plurality of sensors configured to detect a vehicle speed, an acceleration, a steering, and an inclination of the shared vehicle; and the detection result is based on the detections of the detection unit.

6. The control device according to claim 5, wherein the control device sends, to the server device, information indicating a state of atmosphere in the vehicle cabin to adjust the comfort level.

7. The control device according to claim 5, wherein the control device sends, to the server device, a captured image of an inside of the vehicle cabin to adjust the comfort level.

8. A shared vehicle comprising the control device according to claim 5.

9. An operation method for an information processing system having a server device and a control device of a shared vehicle that sends and receives information to and from the server device, wherein:

the control device sends, to the server device, a detection result of detecting an effect of a passenger on a vehicle body or equipment of the shared vehicle; and the server device sends, to a terminal device, information on a comfort level in a vehicle cabin of the shared vehicle that is determined based on the detection result to present the information to another passenger before boarding the shared vehicle, wherein:

the server device further sends, to the terminal device, information on the comfort level in a vehicle cabin of another shared vehicle, the server device further sends, to the terminal device, information for prompting the other passenger to select one of a shared vehicle selected from the shared vehicle and the other shared vehicle based on a comparison of the comfort level of the shared vehicle and the comfort level of the other shared vehicle, the comfort level is further determined based on a vehicle weight of the shared vehicle and a seating state of seats, the control device sends, to the server device, information indicating a behavior of the shared vehicle and the server device adjusts the comfort level in consideration of the behavior, and the information on the comfort level sent by the server device to the terminal device to present the information to the other passenger is to aid in the selection between the shared vehicle and the other shared vehicle based on the comparison of the comfort level of the shared vehicle and the comfort level of the other shared vehicle;

the detection result includes the vehicle weight of the shared vehicle and the seating state of seats;

the seating state of seats includes a number of occupied seats;

when a number of the passengers calculated from the vehicle weight is equal to or smaller than the number of occupied seats, the control unit adopts the comfort level based on the number of occupied seats;

when the number of the passengers calculated from the vehicle weight exceeds the number of occupied seats, the control unit reduces the comfort level based on the number of occupied seats in accordance with the number of the passengers that exceeds the number of occupied seat;

the shared vehicle further comprises a detection unit including :

a vehicle weight sensor provided on a suspension of the shared vehicle and configured to detect the vehicle weight of the shared vehicle;

a plurality of seating sensors provided on each seat of the shared vehicle to detect whether a passenger is seated or not seated based on a load on a seat surface of the shared vehicle;

at least one sensor configured to detect a temperature, a humidity, a smell, and a carbon dioxide concentration in the vehicle cabin of the shared vehicle; and a plurality of sensors configured to detect a vehicle speed, an acceleration, a steering, and an inclination of the shared vehicle; and the detection result is based on the detections of the detection unit.

10. The operation method according to claim 9, wherein:

the control device sends, to the server device, information indicating a state of atmosphere of the vehicle cabin; and the server device adjusts the comfort level in consideration of the state of the atmosphere in the vehicle cabin.

11. The operation method according to claim 9, wherein:

the control device sends, to the server device, a captured image of an inside of the vehicle cabin; and the server device adjusts the comfort level in consideration of the captured image.

* * * * *